United States Patent [19]

Hapke

[11] 4,411,399

[45] Oct. 25, 1983

[54] RETRACTABLE NOZZLE FAIRING SYSTEM FOR AEROPLANE CENTER BOOST ENGINE

[75] Inventor: Donald W. Hapke, Issaquah, Wash.

[73] Assignee: The Boeing Company, Seattle, Wash.

[21] Appl. No.: 306,906

[22] Filed: Sep. 29, 1981

[51] Int. Cl.³ ........................ B64C 1/38; B64D 29/04
[52] U.S. Cl. ............................... 244/130; 244/53 R;
             244/55; 244/58; 239/265.33
[58] Field of Search ............... 244/58, 119, 129.1,
         244/130, 53 R, 110 B, 55; 60/242, 271;
         239/265.13, 265.19, 265.33, 265.37, 265.43;
         181/213, 214, 215, 216, 217

[56] References Cited

U.S. PATENT DOCUMENTS

| | | | |
|---|---|---|---|
| 2,737,411 | 3/1956 | Potter | 244/130 |
| 3,067,968 | 12/1962 | Heppenstall | 244/53 R |
| 3,412,962 | 11/1968 | Killian | 244/130 |

FOREIGN PATENT DOCUMENTS

1300405 12/1972 United Kingdom .................. 60/271

*Primary Examiner*—Trygve M. Blix
*Assistant Examiner*—Rodney Corl
*Attorney, Agent, or Firm*—Hughes, Barnard & Cassidy

[57] ABSTRACT

A retractable/deployable nozzle fairing for use with a center boost engine on a jet propelled aircraft having the capability of aerodynamically fairing the center boost engine's exhaust nozzle and reducing the diameter of the empennage outlet when deployed so as to minimize the base drag characteristics of the empennage body structure when the center boost engine is shut down. More particularly, an exhaust nozzle retractable/deployable fairing for use with aircraft of the type commonly employing multiple main power plants and an auxiliary center boost engine of the type which is commonly used only: (i) during take-off; (ii) during air refueling operations, and/or (iii), under certain emergency operating conditions; and, wherein the retractable/deployable fairing member is formed of flexible sheet material that is fabricated into a truncated generally conical nozzle configuration—i.e., it is fabricated in the deployed condition constituting the "zero stressed" state—having a parting line along the fairing keel line. Suitable actuators attached to the empennage body frames are provided for shifting the fairing member between its fully deployed truncated conical position (a "zero stressed" state) and its fully retracted position in which the fairing parts along its keel line as it is moved into a retracted position surrounding the upper portion of the exhaust nozzle, at which point the retracted nozzle fairing is fully stressed. In use, when the fairing is retracted, it is expanded around the nozzle; and, when it is deployed, it is shifted rearwardly to form a truncated conical extension of the nozzle, thus reducing the diameter of the empennage outlet and, consequently, reducing the base drag characteristics of the empennage body structure.

46 Claims, 9 Drawing Figures

RETRACTABLE NOZZLE FAIRING SYSTEM FOR AEROPLANE CENTER BOOST ENGINE

RELATED APPLICATION

Donald W. Hapke Ser. No. 306,748, filed Sept. 29, 1981, for "Deployable Inlet for Aeroplane Center Boost Engine."

BACKGROUND OF THE INVENTION

1. Field of the Invention

The present invention relates in general to center boost engines for use with aircraft having multiple main power plants; and, more particularly, to an aeroplane center boost engine of the type mounted within the tail portion of the aeroplane and having a rearwardly facing exhaust nozzle at the aft end of the aircraft's empennage body structure, and a retractable/deployable fairing member surrounding the exhaust nozzle and capable of being shifted rearwardly relative to the exhaust nozzle into a deployed state in which the fairing member forms a truncated cone having a reduced nozzle exit opening and a parting line coincident with the keel line of the nozzle. Thus, the rectractable/deployable fairing member serves to reduce the size of the exhaust nozzle and empennage outlets when the center boost engine is inoperative; but, can be readily retracted into an expanded or stressed position surrounding the exhaust nozzle when the center boost engine is in operation—normally during takeoffs, air refueling operations, and in certain emergency situations. The type of center boost engine here under consideration is commonly employed in certain military aircraft such, for example, as bombers.

Since center boost engines of the foregoing character are only operated during certain periods of in-flight operation, a need has long existed and has been recognized for providing some means for compensating for and, preferably, for eliminating, the undesired drag that is created by the engine inlet and the exhaust nozzle for such an engine. However, prior to the advent of the present invention, there has been no satisfactory solution to the drag problems created with center boost engines—in large part because the provision of deployable and/or retractable fairing structures has required complex and expensive mechanical configurations which, by their very nature, have required dedication of significant amounts of aircraft structure and volumetric storage space for the fairing components when not in use. Moreover, the use of such additional structural components tends to not only involve complex structure and actuating mechanisms, but, moreover, such proposed arrangements have generally tended to significantly increase the base weight of the aircraft, as well as to increase the very drag components that such systems are intended to minimize. The present invention relates specifically to a simple, yet highly effective, system for overcoming the foregoing problems and for providing a retractable/deployable fairing member capable of reducing the size of the exhaust nozzle and empennage outlets when the center boost engine is shut down so as to minimize the base drag characteristics of the empennage body structure. Those persons interested in the details of an improved aerodynamically faired deployable inlet for such center boost engine installations are referred to the aforesaid copending application, Ser. No. 306,748, filed Sept. 29, 1981, for "Deployable Inlet for Aeroplane Center Boost Engine."

2. Description of the Prior Art

The use of auxililary jet propulsion engines which are not intended for continuous use in flight has long been known in the prior art. For example, in U.S. Pat. No. 2,810,534—Fandeux, the patentee discloses the use of an auxiliary engine carried within a streamlined nacelle mounted beneath the fuselage of a twin propeller-driven aircraft. Although the nacelle is streamlined, presumably to reduce drag, the patentee does not discuss the desirability of being able to selectively open and/or close the auxiliary engine air inlet for the exhaust nozzle.

Another early patent of general interest in U.S. Pat. No. 2,557,522—Vautier, which, although not relating to the use of an auxiliary engine, is of interest for its disclosure of a pair of engines mounted within the fuselage and provided with air through a centrally disposed air inlet mounted on the upper surface of the aircraft fuselage forward of the vertical stabilizer. The patentee does not disclose any means for selectively opening or closing either the air inlet or the exhaust nozzle.

U.S. Pat. No. 3,237,891—Wotton, discloses an aircraft propelled by three turbo-fan engines, one of which is disposed within the engine fuselage beneath the vertical stabilizer, and the other two of which are mounted outboard of the engine fuselage. No reference is made as to the contemplated use of the centrally disposed engine as a "center-boost" or auxiliary jet engine. The central engine is supplied with air through an air inlet mounted forward of, and at the root of, the vertical stabilizer. No provision is made for selectively opening or closing either the air inlet or the exhaust nozzle.

Other patents of general interest are U.S. Pat. Nos. 3,134,561—Clejan, and 4,130,258—Fox. Each of these patents disclose aircraft having auxiliary power units which are retractably mounted so that they can be retracted into the aircraft fuselage when not in use.

A further disclosure of general interest is that contained in U.S. Pat. No. 3,109,610—Quenzler et al., a patent assigned to the assignee of the present invention. This patent discloses an aircraft having three jet engines, one of which is mounted within the fuselage and the other two of which are mounted outboard thereof. The central engine is provided with a centrally located air inlet scoop along the bottom longitudinal axis of the fuselage. The patentees are here principally concerned with the problems associated with ingestion of foreign material into the central engine; and, to inhibit this, they provide a pivoted flap at the forward end of the air scoop. However, such flap is intended only to inhibit entry of foreign material into the air scoop and is not intended to, nor capable of, closing off the air inlet or minimizing drag. Again, no provision is made in this patent for closing the center engine exhaust nozzle so as to minimize drag.

Keenan et al. U.S. Pat. No. 3,279,191 describes an aircraft gas turbine power plant comprising a main engine having a main centrally located air intake and a pair of auxiliary engines located outboard thereof. The air inlets to the auxiliary engines communicate with the main engine air inlet; and, pivoted doors are provided for closing the auxiliary air inlets when the auxiliary engines are not in use.

U.S. Pat. No. 3,489,377—Pearson et al. discloses an arrangement wherein an aircraft is provided with two outboard main propulsion engines and a centrally located auxiliary gas turbine engine. The center auxiliary engine is provided with a pair of air inlets and a pair of alternatively usable exhaut gas outlets, one of which is directed rearwardly and the other of which is directly vertically upward. The air inlets for the center engine are provided with hinged doors which can be opened either inwardly or outwardly and are designed so as to produce minimum drag on the aircraft when the doors are open in flight.

U.S. Pat. No. 3,472,029—Colley, is of interest for its disclosure of an auxiliary engine having a pair of air inlets located within the air inlet for the main engine, and a single downwardly directed exhaust gas outlet. A hinged closure member is provided for closing the exhaust gas outlet when the auxiliary engine is not in use.

Ward U.S. Pat. No. 3,172,623 is of interest for its disclosure of an aircraft having a central main power plant with a forwardly directed, laterally divided, air intake. A pair of streamlined pods are suspended from the delta-shaped wing of the aircraft on either side of the fuselage. Each pod contains a pair of jet engines with one engine in each pair having a forwardly facing air inlet and the other engine in each pair having a rearwardly facing air inlet. Both engines in each pod have coaxial exhaust nozzles with means to direct the exhaust gases vertically downward. The forward ends of each pod are provided with a pair of pivotally mounted doors which are in a closed position when the forward pod engines are not operating and which may be opened like the upper and lower jaws of a mount when it is desired to operate the forward engines. Similarly, both pods are provided with second pairs of pivotally mounted doors which can be moved between opened and closed positions so as to define air inlet scoops for the rearmost engines in the pods when the doors are open.

Two other references are of incidental interest are Axiehla et al. U.S. Pat. No. 3,592,414 and Tharratt U.S. Pat. No. 2,506,976. The Axiehla et al. patent discloses an adjustable tail cone assembly which is located between adjacent variable area jet engine nozzles and which is adjustable to provide a relatively smooth transition zone between the exterior surface of the tail and the nozzles. Tharratt is of interest merely for its disclosure of hinged panels in the aircraft fuselage which may be pivoted to an open position to permit ejection of rockets.

Unfortunately, however, systems of the foregoing types simply have not effectively dealt with, nor solved, the problems of increased drag associated with the exhaust nozzles of auxiliary jet engines which are normally inoperative during cruise conditions of the aircraft.

SUMMARY OF THE INVENTION

Accordingly, it is a general aim of the present invention to provide an improved retractable/deployable fairing for aerodynamically streamlining the exhaust nozzle of an inoperative or shut-down auxiliary center boost engine, and which overcomes the foregong disadvantages inherent with known prior art constructions and serves to effectively minimize undesired base drag at the empennage outlet when such engines are inoperative.

In one of its important aspects, it is an object of the invention to provide a simple retractable/deployable fairing member formed of flexible sheet material which can be readily and easily stowed internally in the aircraft's empennage body structure but externally of, and at least partially surrounding, the engine duct and nozzle assembly when in the retracted position (i.e., when the auxiliary engine is operational); yet which can be easily translated rearwardly relative to the engine duct and exhaust nozzle assembly when the engine is shut down, thereby progressively assuming a truncated conical configuration until such time as the sheet-like fairing member is fully deployed at which point the opposed longitudinal edges of the fairing member are locked together along the keel line of the assembly to form a smooth aerodynamically streamlined truncated conical empennage extension defining an outlet of substantially reduced diameter and dimensioned so as to minimize the base drag characteristics at the empennage outlet when the center boost engine is shut down.

It is another and more detailed object of the invention to provide a sheet-like fairing member for aerodynamically streamlining the empennage body surrounding an auxiliary engine exhaust nozzle, and which is prefabricated in the truncated conical configuration that such fairing member assumes when in the deployed state so that the fairing is prestressed towards the truncated conical deployed position; and, where the truncated conical fairing is gradually expanded as the fairing is retracted and assumes a stowed inoperative position surrounding the upstream or forward portions of the engine duct and exhaust nozzle assembly preparatory to operation of the center boost engine. To assist in attaining this objective of the invention, the fairing member may, but need not, be undersized during its fabrication.

Yet another of the more detailed objectives of the invention, is the provision of a simplified guide, track and actuating system interconnecting the outer surface of the exhaust nozzle assembly and the inner surface of the sheet-like flexible fairing member for guidng and controlling the fairing as it is shifted between its fully retracted and fully stressed inoperative state at least partially surrounding the upper portion of the exhaust nozzle assembly, and its fully deployed "zero stressed" state—i.e., a rearwardly extending, conical, truncated, conical extension of the empennage body—when the auxiliary center boost engine is shut down.

DESCRIPTION OF THE DRAWINGS

These and other objects and advantages of the present invention will become more readily apparent upon reading the following detailed description and upon reference to the attached drawings, in which.

While the invention is susceptible of various modifications and alternative forms, a specific embodiment thereof has been shown by way of example in the drawing and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DETAILED DESCRIPTION

Figure 1:
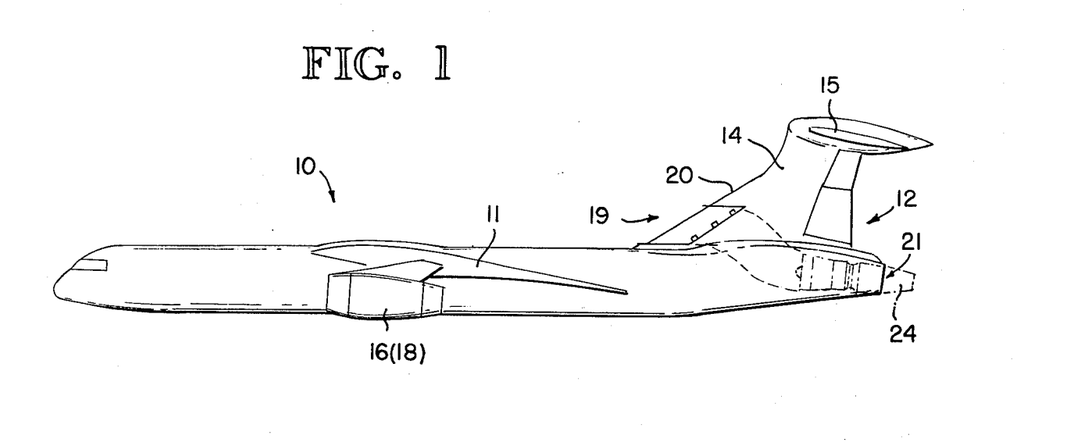
FIG. 1 is a side elevational view of a jet propelled aircraft of the type employing an auxiliary center boost engine mounted in the tail section of the aircraft fuselage and having an air inlet formed in the lower root portion of the aircraft's vertical stabilizer leading edge and an exhaust nozzle at the rear of the aircraft's empennage body structure.

Turning now to the drawings, there has been illustrated in FIG. 1 an exemplary jet propelled aircraft, generally indicated at 10, of the type having a primary airfoil 11 and an empennage, generally indicated at 12, including a vertical stabilizer 14 and a tail plane 15. The illustrative aircraft 10 is depicted in the drawings as being of the type having a pair of main jet propulsion engines 16, 18 mounted on, and suspended from, the primary airfoil 11 (while only the port engine 16 is visible in FIG. 1, it will be understood by those skilled in the art that the starboard engine 18 would be mounted on, and suspended from, the starboard portion of the primary airfoil 11 in the same manner as engine 16). Of course, while the present invention has been illustrated and will herein be described in connection with an aircraft having two main jet propulsion engines 16, 18, it will be appreciated that the invention is not limited to use with twin engine aircraft and might, *merely by way of example,* find equally advantageous application in multi-engine aircraft employing four or more primary power plants.

As here shown and described, the invention is primarily intended for use with any multi-engine aircraft of the type employing a jet propulsion center boost engine (not shown) for purposes of power assist during take-off, air refueling operations, and/or certain other emergency operating conditions. As such, a typical jet propulsion center boost engine would be conventionally mounted within the empennage body structure 12 of the aircraft 10 and would commonly be provided with an air inlet, generally indicated at 19, formed in the lower or root portion of the leading edge 20 of the vertical stabilizer 14. An exhaust nozzle, generally indicated at 21, is provided within the empennage body structure 12 at the rear at the aircraft's main body. As previously indicated, while the present invention is concerned primarily with minimizing and/or optimizing the drag characteristics associated with the empennage outlet and exhaust nozzle 21 for the center boost engine when the latter is shut down and inoperative, significant drag is also associated with the air inlet 19 during most *cruise* modes of operation; and, provisions for minimizing such undesired drag associated with the air inlet are more fully set forth in the aforesaid copending application Ser. No. 306,748, filed Sept. 29, 1981, entitled "Deployable Inlet for Aeroplane Center Boost Engine."

In accordance with one of the important aspects of the present invention, provision is made for reducing the size of the outlet defined by the exhaust nozzle 21 when the center boost engine is shut down—i.e., during normal *cruise* operational modes—so as to minimize the base drag characteristics of the empennage body structure. To this end, a fairing member 22 formed of sheet-like flexible material (best illustrated in pattern-like form in FIG. 8) is provided which is translatable relative to the aircraft's empennage body structure 12 and exhaust nozzle 21 between a fully retracted or inoperative position (FIGS. 1 and 3) when the center boost engine is operational, and a fully deployed or operative position (FIGS. 2 and 4) when the center boost engine is shut down, and where the fairing member 22 forms an aerodynamically streamlined truncated conical extension 24 (FIGS. 2 and 4) of the empennage body 12, thereby substantially reducing the diameter of the empennage outlet—viz, from a diameter $D_1$ when the fairing member 22 is retracted to a substantially reduced diameter $D_2$ when the fairing member is deployed—yet, wherein there is no need to dedicate significant amounts of aircraft structure and volumetric storage space for housing the fairing member 22 when not in use.

Figure 4:
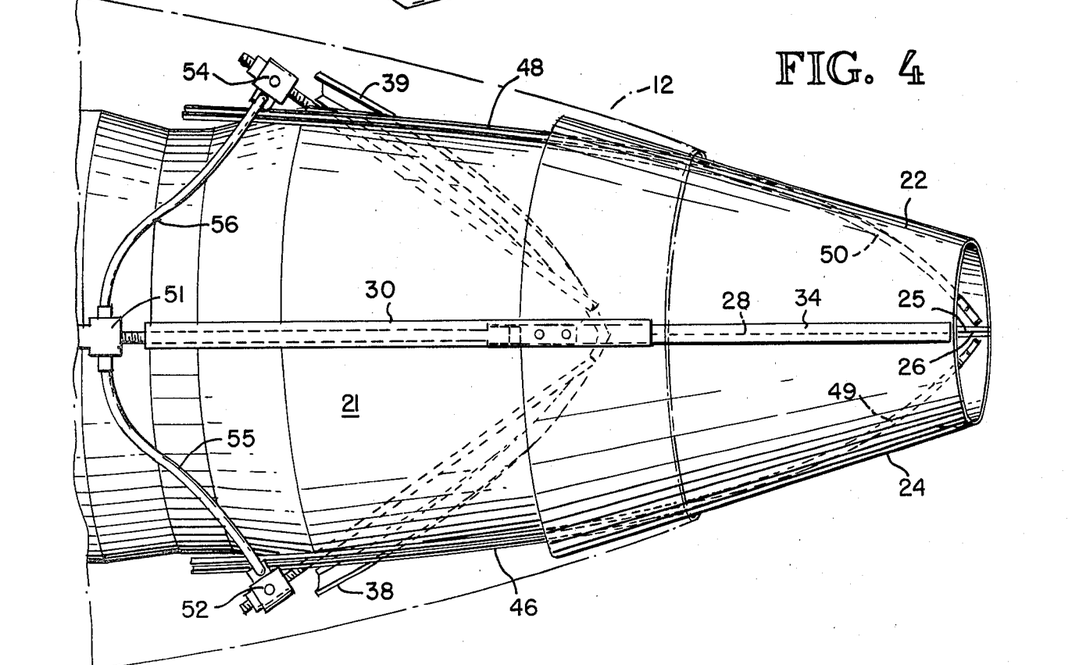
FIG. 4 is a plan view taken substantially along the line 4—4 in FIG. 2 and illustrating the fairing member of the present invention in its fully deployed "zero stressed" state.
Figure 8:
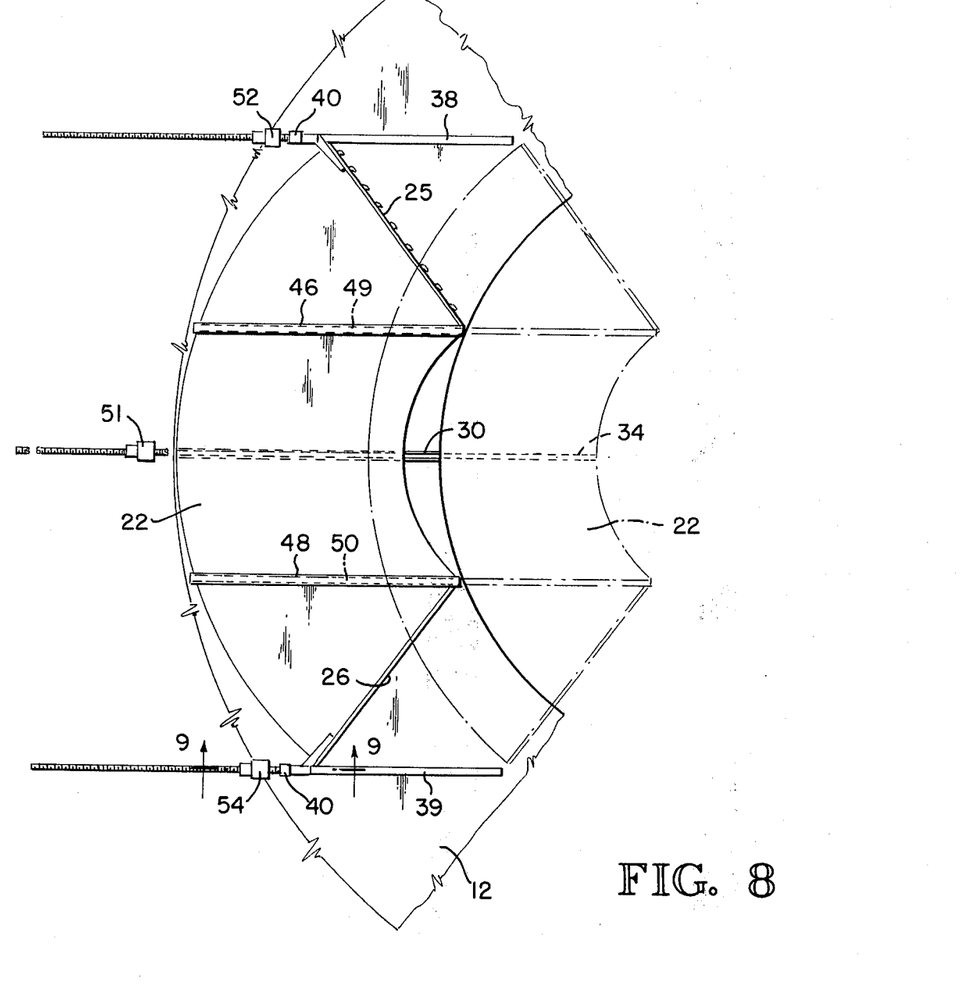
FIG. 8 is a diagrammatic bottom plan view of the sheet-like fairing member of the present invention and a fragmentary portion of the empennage body structure with the foregoing components depicted in flat pattern-like form for purposes of facilitating an understanding of the invention, and illustrating also a portion of the actuating mechanism employed for translating the fairing member relative to the empennage and exhaust nozzle; and, FIG. 9 is a sectional view taken substantially along the line 9—9 in FIG. 8 illustrating particularly details of the actuating mechanism and track guidance arrangement employed for translating the sheet-like fairing member between its fully deployed unstressed state (FIGS. 2 and 4) and its fully stressed and retracted state (FIG. 3).

In carrying out the present invention, the fairing member 22 is preferably formed of sheet-like flexible material which, when laid out in pattern-like form as depicted in FIG. 8, comprises a segment of ring-shaped configuration having opposed chordal edges 25, 26 which are adapted to be abutted together when the sheet-like flexible fairing member is formed into a truncated conical configuration, with the opposed chordal edges 25, 26 then defining opposed longitudinal edges lying along a parting line 28, as best illustrated in FIG. 4. In order to optimize the shape characteristics of the fairing member 22, it is preferably prefabricated in a truncated conical configuration so that when deployed it is in the "zero stressed" state (considering only static stress characteristics of the fairing member per se, and excluding externally applied aerodynamic stress conditions); and, when fully retracted, the fairing member is fully flexurally stressed. As a consequence of this construction, the prefabricated static stress characteristics of the fairing member 22 are such that it tends to assume a truncated conical configuration and, therefore, internally imposed forces assist in shaping the fairing member as it is translated between deployed and retracted positions with the fairing member tending to snugly conform to the truncated conical configuration of the exhaust nozzle 21 at all longitudinal positions relative thereto.

Figure 2:
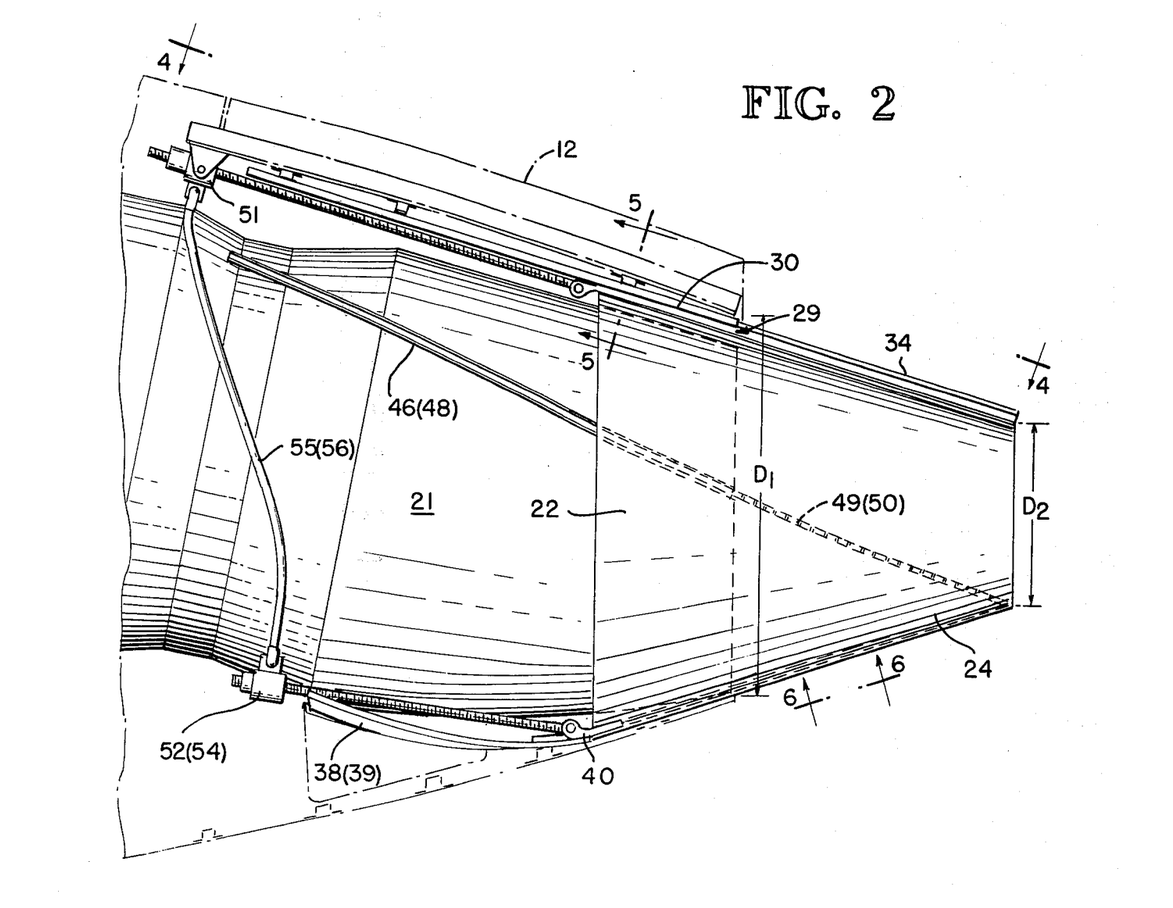
FIG. 2 is an enlarged fragmentary view, partly in section, illustrating the aircraft's empennage body structure (shown in phantom) and exhaust nozzle assembly with a retractable/deployable fairing member embodying the features of the present invention here being depicted in the deployed condition—viz, the position assumed when the center boost engine is shut down and inoperative.
Figure 3:
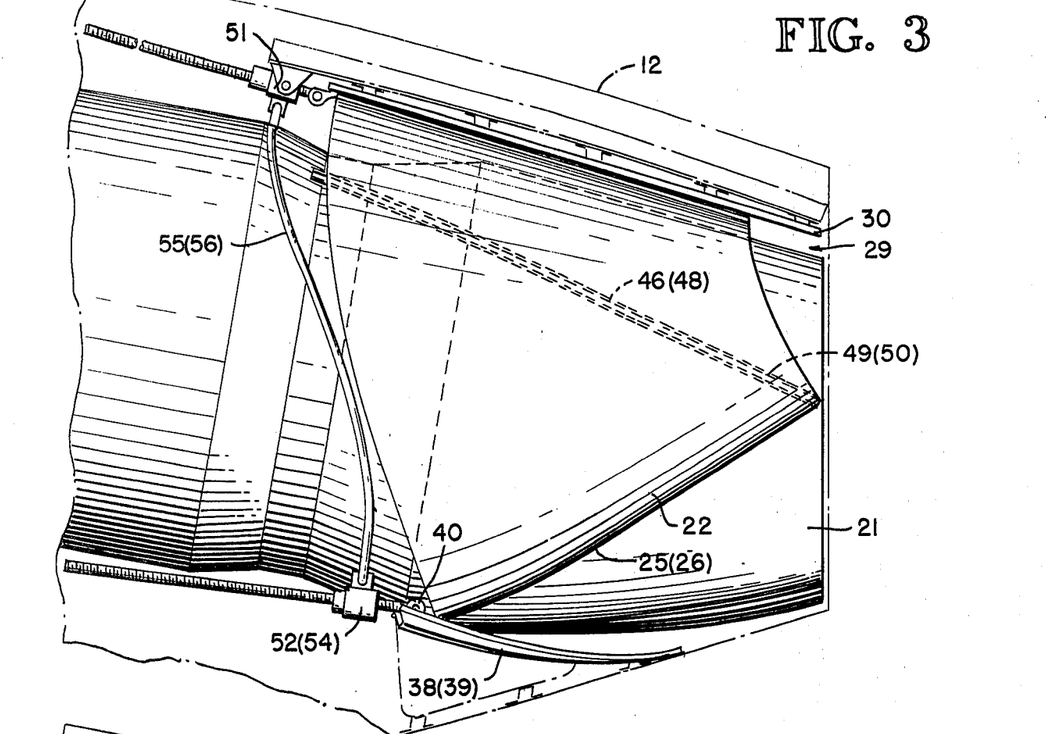
FIG. 3 is a view similar to that depicted in FIG. 2, but here illustrating the fairing member in its fully stressed retracted position—viz, the position assumed when the center boost engine is operative.

As best illustrated by reference to FIGS. 2, 3 and 4 conjointly, it will be observed that the rearmost extremities of the aircraft's empennage body structure 12 and exhaust nozzle 21 are each of truncated conical configuration, with the exhaust nozzle 21 (which is fixedly mounted within the empennage body structure by conventional mounting means, not shown) being spaced inwardly from and generally coaxial with the empennage body structure 12, thus defining an annular space 29 of truncated conical configuration therebetween. Such annular space 29 serves to house the fairing member 22 and its mounting and actuating components.

In keeping with the present invention, provision is made for mounting the sheet-like flexible fairing member 22 on at least one of the empennage body structure 12 and the exhaust nozzle 21 with freedom for relative longitudinal translation with respect thereto between: (i) a first *retracted* position (FIGS. 1 and 3) with the sheet-like flexible fairing member 22 expanded outwardly in a stressed truncated conical configuration, and being housed within the annular space 29; and (ii), a second *deployed* position (FIGS. 2 and 4) with the fairing member 22 shifted rearwardly relative to the empennage body structure 12 and exhaust nozzle 21, thereby permitting the fairing member to contract and assume a "zero stressed" truncated conical configuration comprising a truncated conical extension 24 of the empennage body structure 12 wherein the empennage outlet is reduced from a fixed diameter $D_1$ to a substantially smaller diameter $D_2$, as best shown in FIG. 2. To accomplish this, the exemplary nozzle fairing system here illustrated and described is provided with a plurality of mounting means preferably taking the form of mutually engageable track/follower couplings each comprising track defining means and track follower means, with one of the track defining means and track follower means fixedly secured to the fairing member 22, and the other of the track defining means and track follower means fixedly connected to at least one of the empennage body structure 12 and/or the exhaust nozzle 21.

Figure 5:
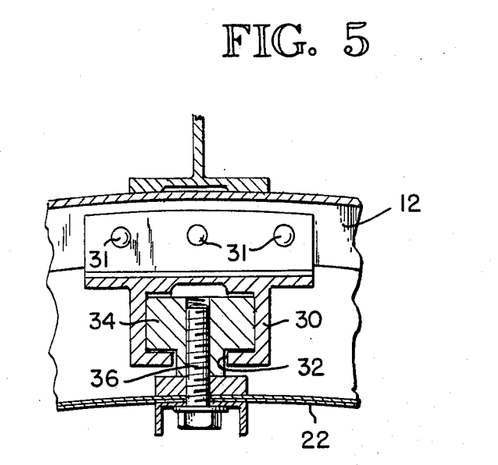
FIG. 5 is a sectional view taken substantially along the line 5—5 in FIG. 2, here illustrating details of the support and guidance structure employed for controlling movement of the flexible fairing member as it is translated between fully retracted and fully deployed positions.

More specifically, and as best illustrated by reference to FIGS. 2 through 5 conjointly, the exemplary exhaust nozzle fairing system includes a first longitudinally extending elongate track member 30 which is fixedly mounted on the upper inner surface of the empennage body structure 12 in any suitable manner such, for example, as by rivets, welding or other suitable fasteners 31 (FIG. 5). As here shown, the track member 30 comprises an inverted "C"-shaped female track defining a downwardly presented longitudinally extending keyway guide 32 adapted to receive an elongate male slide 34 which may be defined by a series of carbon slide blocks or the like secured to the outer surface of the fairing member 22 along the longitudinal centerline thereof by means of suitable fasteners 36 or the like. The arrangement is such that as the fairing member 22 is translated between a fully retracted position (FIG. 3) and a fully deployed position (FIGS. 2 and 4), the carbon slide blocks 34 translate along the track 30 while being retained captive thereby.

Figure 9:
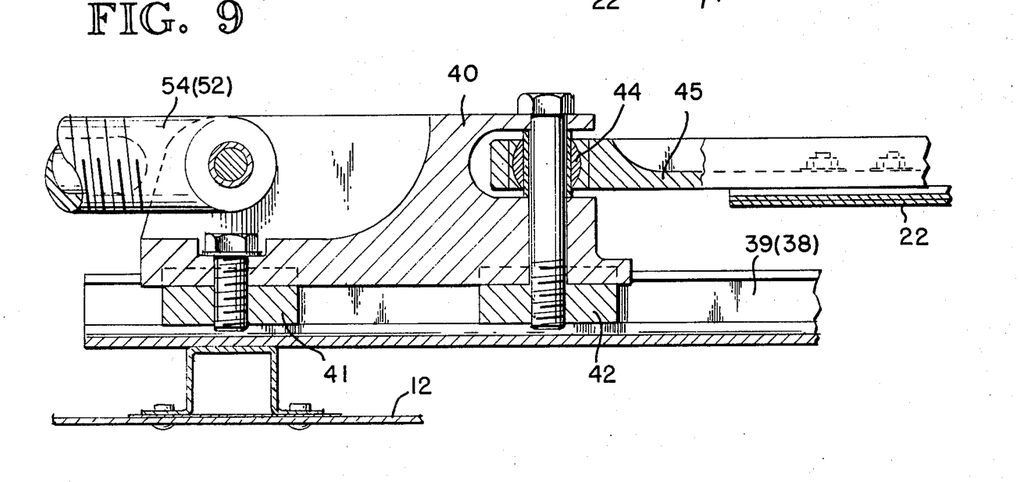

In order to guide the longitudinal edges 25, 26 of the fairing member 22 during deployment and/or retraction of the fairing member, port and starboard elongate curved female tracks—best illustrated by reference to FIGS. 3 and 4 conjointly, and indicated at 38 and 39, respectively—are fixedly mounted to the inner surfaces of the empennage body structure 12 in any suitable manner (not shown), with the two track members 38, 39 converging towards the keel line of the empennage body structure 12 immediately beneath the outlet of exhaust nozzle 21; and, diverging from one another as they extend forwardly along the inner periphery of the empennage body structure. The tracks 38, 39 are preferably mounted on the inner surface of the truncated conical portion of the empennage body structure 12 in such a manner as to remain generally equidistant circumferentially from the upper lineal longitudinal track 30 as the diameters of the empennage body structure 12 decrease and/or increase with changes in longitudinal position. Track follower carriages or assemblies 40 (FIG. 9) including carbon slide follower blocks 41, 42 are mounted within each of the curved female track members 38, 39 and are secured through ball-and-socket connections 44 to connecting rods 45 securely affixed to the leading or forward ends of the flexible sheet-like fairing member 22 adjacent respective ones of the opposite longitudinal edges 25, 26.

The arrangement is such that as the fairing member 22 is shifted from a fully retracted position (FIG. 3) to a fully deployed position (FIG. 4), the upper carbon slide blocks 34 move rearwardly along the longitudinal track 30 and, at the same time, the port and starboard track followers 40 move rearwardly and towards one another along the curved converging port and starboard tracks 38, 39; thereby bringing the opposed longitudinal edges 25, 26 of the fairing member 22 towards one another until they ultimately abut one another along the parting line 28 which is generally coincident with the keel lines of the empennage body structure 12 and the exhaust nozzle 21. Such movement is assisted by the static stress characteristics of the sheet-like fairing member 22 which was prefabricated in its truncated conical configuration and which, therefore, tends to assume the deployed aerodynamically streamlined truncated conical shape as the fairing is deployed in a rearward direction. During retraction of the fairing member 22 from the position shown in FIGS. 2 and 4 to the position shown in FIG. 3, the outboard track followers 40 translate along the diverging tracks 38, 39 so as to spread or expand the flexible sheet-like fairing member 22 from its deployed truncated conical configuration to an expanded state wherein the fairing member 22 partially surrounds the upper regions of the truncated conical exhaust nozzle 21 with the opposed longitudinal edges 25, 26 being parted along the parting line 28 as the fairing member moves towards its fully retracted position.

To provide further support and guidance, and to insure smooth, accurate and precise positioning of the retractable/deployable sheet-like flexible fairing member 22 as it is translated between deployed and retracted positions, fourth and fifth female tracks 46, 48 may be secured, for example, to the outer surface of the truncated conical portion of the exhaust nozzle 21 and positioned to respectively receive a series of carbon slide blocks 49, 50 fixedly secured to the inner surface of the sheet-like flexible fairing member 22. As best shown in FIG. 8, the carbon slide blocks 49, 50 generally extend from the rear or trailing ends of the opposed longitudinal edges 25, 26 of fairing member 22 along lines which are substantially equidistant circumferentially from the upper track 30 which is coincidant with the longitudinal centerline of the fairing member. Thus, as the fairing member 22 is translated longitudinally, the track/follower coupling 30/34 defined by the track 30 and the carbon block follower 34 serves to guide and control the position of the longitudinal centerline of the fairing member 22; the track/follower couplings 38/40 and 39/40 defined by the tracks 38, 39 and followers 40 serve to guide and control the leading ends of the opposed longitudinal edges 25, 26 of the fairing member 22; and, the track/follower couplings 46/49 and 48/50 defined by the tracks 46, 48 and followers 49, 50 serve to guide and control the trailing ends of the longitudinal edges 25, 26 of the fairing member 22.

For the purpose of actuating the retractable/deployable sheet-like flexible fairing member 22, the exemplary apparatus illustrated in the drawings includes three conventional screw jack actuators 51, 52 and 54 which are secured in any suitable manner (not shown) to a fixed portion of the aircraft structure such, for example, as the interior of the empennage body structure 12. As here illustrated, screw jack actuator 51 is coupled directly to the carbon block track follower 34 and serves to translate the follower 34 (and, therefore, the fairing member 22) longitudinally along the upper longitudinal female track 30 secured to the inner surface of empennage body structure 12. Screw jack actuators 52, 54 are, in turn, coupled directly to respective ones of the port and starboard track followers 40 associated with respective ones of the port and starboard curved tracks 38, 39 supported on the inner surface of the empennage body structure 12. Preferably, the screw jack actuators 51, 52 and 54 are synchronously driven by any suitable power means (not shown) through interconnecting flexible drive shafts 55, 56 (FIGS. 2, 3 and 4).

Thus, activation of the screw jack actuators 51, 52 and 54 in one direction serves to shift the carbon track followers 34 and 40 rearwardly along the tracks 30, 38 and 39 on the inner surface of the truncated conical portion of empennage body structure 12, thereby translating the sheet-like flexible fairing member 22 rearwardly; and, through the combined effect of: (a) the static stress characteristics of the fairing member 22 per se; and (b), the guidance provided by (i) the upper central track/follower coupling 30/34, (ii) the two leading or forward edge track/follower couplings 38/40 and 39/40, and (iii) the two trailing or aft edge track/follower couplings 46/49 and 48/50; the sheet-like flexible fairing member 22 is contracted and assumes progressively decreasing diameters as it is deployed, ultimately assuming a truncated conical configuration 24 with its longitudinal edges 25, 26 abutting; thereby defining a truncated conical extension 24 of the empennage body structure 12 having a substantially reduced outlet diameter $D_2$ (FIG. 2). During retraction of the fairing member 22, the screw jack actuators 51, 52 and 54 are driven in the reverse direction so as to shift the followers 34, 40 in a forward direction along the tracks 30, 38 and 39, thus spreading or expanding the flexible sheet-like fairing member 22 as it translates forwardly along the tracks until the fairing member is fully retracted and housed within the truncated conical annular space 29 defined by the empennage body structure 12 and exhaust nozzle 21.

Figure 6:
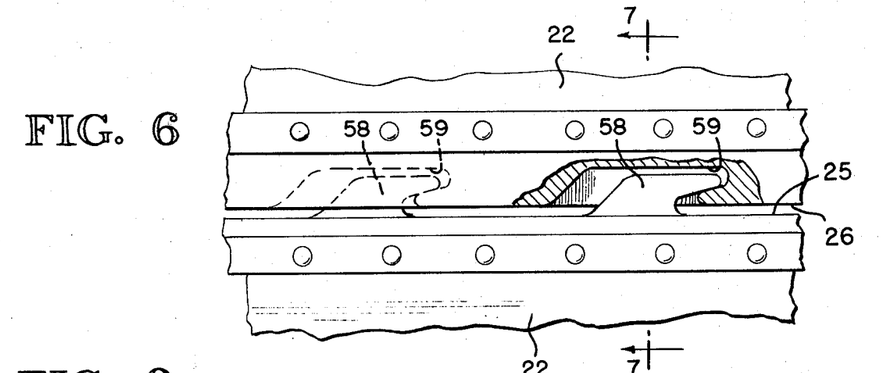
FIG. 6 is a bottom plan view, partly in section, taken substantially along the line 6—6 in FIG. 2, here illustrating an exemplary bayonet-type locking mechanism suitable for interconnecting the opposite longitudinal edges of the sheet-like fairing member along the keel line thereof for maintaining the fairing member in an aerodynamically smooth truncated conical configuration when in the deployed state.
Figure 7:
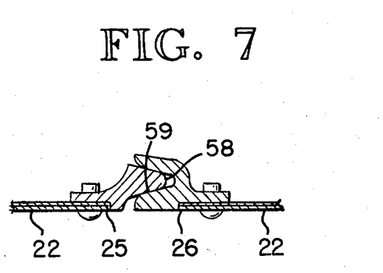
FIG. 7 is a sectional view taken substantially along the line 7—7 in FIG. 6 illustrating details of the exemplary bayonet-type locking mechanism.

In keeping with the invention, provision is made for interlocking the opposed longitudinal edges 25, 26 of the fairing member 22 when the fairing is deployed in its truncated conical configuration 24. To accomplish this, the opposed longitudinal edges 25, 26 may be respectively formed with oppositely presented, longitudinally extending, mutually engageable tongue and groove surfaces (not shown); or, alternatively, they may optionally be provided with a positive interlocking connection in the form of, for example, interfitting bayonet-type lugs and slots. Thus, referring to FIGS. 6 and 7, it will be noted that the longitudinal edge 25 of fairing member 22 is provided with a series of laterally projecting bayonet-type lugs 58, while longitudinal edge 26 of fairing member 22 is provided with a series of complementary shaped lug-receiving slots 59. In operating this optional form of interlocking mechanism, a slight differential translational motion is imparted by the outboard screw jack actuators 52, 54 so that edge 26 of fairing member 22 reaches its fully deployed rearwardly extended limit position prior to the opposite edge 25 reaching its fully deployed position, thereby permitting the bayonet-type lugs 58 to enter the slots 59 during the final incremental portion of longitudinal movement of edge 25 so as to form a breach-type interlocking system. During retraction of the fairing member 22, slight differential translational motion is again imparted by the outboard screw jack actuators 52, 54 so as to shift edge 25 in a forward direction prior to commencement of forward translational movement of edge 26, thereby permitting withdrawal of the lugs 58 from the slots 59.

Those skilled in the art will appreciate that there has hereinabove been described a simple, yet highly effective, system for aerodynamically fairing the empennage body structure and exhaust nozzle of an auxilliary jet propulsion engine when the latter is shut down, and which requires only minimal operating structure and takes advantage of available storage space for housing the fairing member when not in use. Of course, those skilled in the art will appreciate that the track/follower couplings here illustrated by way of example can vary widely without departing from the spirit and scope of the invention. Thus, there can be more or fewer than the five (5) exemplary track/follower couplings illustrated; they may all provide positive interconnection to only the exhaust nozzle, to only the empennage body structure, or to both; either the track or the follower may be fixedly secured to the fairing member on the one hand, and to the exhaust nozzle and/or the empennage body structure on the other hand; the actuating means (which may take the form of other than the exemplary screw jack actuators 51, 52 and 54) can be drivingly connected to either the tracks or the followers dependent only upon which is fixedly secured to the fairing member; and, drive connections can be provided for all or less than all of the track/follower couplings provided only that the actuating forces are applied uniformly so as to prevent cocking or jamming of the fairing member as it is translated. Therefore, the references in the appended claims to "track defining means" and "track follower means" are not intended to be limiting since those skilled in the art will apreciate that "track defining means" and "track follower means" can be easily interchanged without affecting the overall operation of the system.

Moreover, those skilled in the art will appreciate that in its broader aspects, the invention will find application in any environment where it is desired to reduce the outlet of the truncated conical portion of any tubular member. That is to say, in the illustrative form of the invention, the center boost engine exhaust nozzle 21 comprises a tubular structural member having a truncated conical extremity defining a fixed diameter outlet; and, the fairing member 22, when deployed, serves to reduce the size of that outlet. Similarly, the empennage body structure 12 also comprises a tubular structural member which, together with the tubular member defined by the exhaust nozzle 21, serves to define a truncated conical space 29 therebetween for housing the fairing member and its actuating components. In short, while the invention finds particularly advantageous use when employed to aerodynamically fair or streamline the empennage body structure and exhaust nozzle of an auxiliary jet propulsion engine when the latter is shut down, it may also be used to selectively vary the diameter of any discharge outlet associated with a tubular member having a truncated conical configuration.

What is claimed is:

1. A structural assembly having a variable area outlet comprising, in combination:
   (a) a fixed tubular member having a truncated conical end portion defining an outlet of fixed predetermined diameter at the apical end thereof;
   (b) a fairing member formed of sheet-like flexible material at least partially surrounding said truncated conical end portion of said tubular member, said fairing member being free for relative longitudinal translation with respect to said tubular member;
   (c) means for mounting said fairing member on said fixed tubular member with freedom for controlled longitudinal translation relative to said tubular member between: (i) a retracted position partially surrounding said truncated conical end portion of said tubular member; and (ii), a deployed position wherein said fairing member defines a truncated conical extension of said truncated conical end portion of said tubular member with said truncated conical extension having an outlet of substantially reduced diameter at the apical end thereof;
   (d) said mounting means including track defining means and track follower means with one of said track defining means and said track follower means being fixedly secured to said fairing member and the other of said track defining means and said track follower means being fixedly secured to said tubular member so as to permit said sheet-like fairing member to: (i) gradually expand as it translates relative to said tubular member from a fully deployed truncated conical position to a fully retracted position with the opposed longitudinal edges of said fairing member parted with respect to one another; and (ii), gradually contract as it translates relative to said tubular member from a fully retracted position to a fully deployed position with the opposed longitudinal edges of said fairing member being abutted together when in the fully deployed position so as to form said truncated conical extension; and,
   (e) actuating means for translating said fairing member between a fully deployed position and a fully retracted position.

2. A structural assembly having a variable area outlet comprising, in combination:
   (a) a first fixed tubular member having a truncated conical end portion defining an opening of fixed predetermined diameter at the apical end thereof;
   (b) a second fixed tubular member having a truncated conical end portion defining an outlet of fixed predetermined diameter at the apical end of said second tubular member, said second tubular member having exterior dimensions less than the interior dimensions of said first tubular member and being fixedly mounted coaxially within said first tubular member so as to define an annular space between said first and second tubular members;
   (c) a fairing member formed of sheet-like flexible material at least partially surrounding said truncated conical end portion of said second tubular member and disposed within said annular space between said first and second tubular members, said fairing member being free for relative longitudinal translation with respect to said first and second tubular members;
   (d) means for mounting said fairing member on at least one of said first and second tubular members with freedom for controlled translation relative thereto between: (i) a retracted position disposed entirely within said annular space; and (ii), a deployed position wherein said fairing member defines a truncated conical extension of said second tubular member with said truncated conical extension having an outlet of substantially reduced diameter at the apical end thereof;
   (e) said mounting means including track defining means and track follower means with one of said track defining means and said track follower means being fixedly secured to said fairing member and the other of said track defining means and said track follower means being fixedly secured to at least one of said first and second tubular members so as to permit said sheet-like fairing member to: (i) gradually expand as it translates in a first direction relative to said first and second tubular members from a fully deployed truncated conical position to a fully retracted position with the opposed longitudinal edges of said fairing member parted with respect to one another; and (ii), gradually contract as it translates in a second direction relative to said first and second tubular members from a fully retracted position to a fully deployed position with the opposed longitudinal edges of said fairing member being abutted together when in the fully deployed position so as to form said truncated conical extension; and,
   (f) actuating means for translating said fairing member between said fully deployed and said fully retracted positions.

3. A structural assembly as set forth in claim 1 or 2 wherein said sheet-like flexible material defining said fairing member is preformed in its deployed truncated conical configuration with its opposed longitudinal edges abutting and defining a parting line therebetween so that said fairing member is in the zero stressed contracted state when deployed and is in the stressed expanded state when retracted.

4. A structural assembly as set forth in claim 1 or 2 wherein locking means are mounted on the opposed longitudinal edges of said fairing member for locking said edges together when said fairing member is deployed as a truncated conical extension.

5. A structural assembly as set forth in claim 1 or 2 wherein mutually engageable means are mounted on the opposed longitudinal edges of said fairing member for locking said edges together when said fairing member is deployed as a truncated conical extension, said actuating means including means for imparting differential translational movement to the opposed longitudinal edges of said sheet-like flexible fairing member so as to permit mutual engagement and locking of said edges together upon deployment of said fairing member and mutual disengagement and unlocking of said edges upon retraction of said fairing member.

6. A structural assembly as set forth in claim 1 or 2 wherein one longitudinal edge of said sheet-like flexible member is provided with laterally projecting bayonet-type lugs and the opposed longitudinal edge of said sheet-like flexible member is provided with means defining lug-receiving slots, said actuating means including means for imparting differential translational motion to the opposed longitudinal edges of said sheet-like flexible fairing member so as to permit entry of said lugs into said slots upon deployment of said fairing member to lock said longitudinal edges together and withdrawal of said lugs from said slots upon retraction of said fairing member.

7. A structural assembly as set forth in claim 2 wherein said track defining means and said track follower means include at least three track/follower couplings and wherein two of said couplings serve to respectively couple the opposed longitudinal edges of said sheet-like flexible fairing member to at least one of said first and second tubular members, a third of said couplings serves to couple said fairing member to at least one of said first and second tubular members along the longitudinal centerline of said fairing member, and wherein all of said couplings permit of relative translation of said fairing member with respect to said first and second tubular members.

8. A structural assembly as set forth in claim 2 wherein said track defining means and said track follower means include at least three track/follower couplings and wherein two of said couplings serve to respectively couple the opposed longitudinal edges of said sheet-like flexible fairing member to at least one of said first and second tubular members, a third of said couplings serves to couple said fairing member to at least one of said first and second tubular members along the longitudinal centerline of said fairing member, and wherein all of said track follower means are fixedly secured to said fairing member, and said actuating means are drivingly connected to said track follower means for translating said track follower means relative to said track defining means and thereby translating said fairing member with respect to said first and second tubular members.

9. A structural assembly as set forth in claim 2 wherein said track defining means and said track follower means include at least three track/follower couplings and wherein two of said couplings serve to respectively couple the opposed longitudinal edges of said sheet-like flexible fairing member to said first tubular member, a third of said couplings serves to couple said fairing member to said first tubular member along the longitudinal centerline of said fairing member, and wherein all of said couplings permit of relative translation of said fairing member with respect to said first and second tubular members.

10. A structural assembly as set forth in claim 2 wherein said track defining means and said track follower means include at least five track/follower couplings and wherein a first and second of said couplings serve to respectively couple the opposed longitudinal edges of said sheet-like flexible fairing member to at least one of said first and second tubular members, a third of said couplings serves to couple said fairing member to at least one of said first and second tubular members along the longitudinal centerline of said fairing member, the fourth and fifth of said couplings serve to respectively couple said fairing member to at least one of said first and second tubular members along lines intermediate said third coupling and each of said first and second couplings, and wherein all of said couplings permit of relative translation of said fairing member with respect to said first and second tubular members.

11. A structural assembly as set forth in claim 2 wherein said track defining means and said track follower means include at least five track/follower couplings and wherein at first and second of said couplings serve to respectively couple the opposed longitudinal edges of said sheet-like flexible fairing member to at least one of said first and second tubular members, a third of said couplings serves to couple said fairing member to at least one of said first and second tubular members along the longitudinal centerline of said fairing member, the fourth and fifth of said couplings serve to respectively couple said fairing member to at least one of said first and second tubular members along lines intermediate said third coupling and each of said first and second couplings, and wherein all of said couplings permit of relative translation of said fairing member with respect to said first and second tubular members, said track follower means associated with said first, second and third of said couplings are fixedly secured to said fairing member, and said actuating means are drivingly connected to said track follower means associated with said first, second and third couplings for translating all of said track follower means relative to their respective track defining means and thereby translating said fairing member relative to said first and second tubular members between deployed and retracted positions.

12. A structural assembly as set forth in claim 2 wherein said track defining means and said track follower means include at least five track/follower couplings and wherein a first and second of said couplings serve to respectively couple the opposed longitudinal edges of said sheet-like flexible fairing member to said first tubular member, a third of said couplings serves to couple said fairing member to said first tubular member along the longitudinal centerline of said fairing member, the fourth and fifth of said couplings serve to respectively couple said fairing member to at least one of said first and second tubular members along lines intermediate said third coupling and each of said first and second couplings, and wherein all of said couplings permit of relative translation of said fairing member with respect to said first and second tubular members.

13. A structural assembly as set forth in claim 2 wherein said track defining means and said track follower means include at least five track/follower couplings and wherein a first and second of said couplings serve to respectively couple the opposed longitudinal edges of said sheet-like flexible fairing member to at least one of said first and second tubular members, a third of said couplings serves to couple said fairing member to at least one of said first and second tubular members along the longitudinal centerline of said fairing member, the fourth and fifth of said couplings serve to respectively couple said fairing member to said second tubular member along lines intermediate said third coupling and each of said first and second couplings, and wherein all of said couplings permit of relative translation of said fairing member with respect to said first and second tubular members.

14. A structural assembly as set forth in claim 2 wherein said track defining means and said track follower means include at least five track/follower couplings and wherein a first and second of said couplings serve to respectively couple the opposed longitudinal edges of said sheet-like flexible fairing member to said first tubular member, a third of said couplings serves to couple said fairing member to said first tubular member along the longitudinal centerline of said fairing member, the fourth and fifth of said couplings serve to respectively couple said fairing member to said second tubular member along lines intermediate said third coupling and each of said first and second couplings, and wherein all of said couplings permit of relative translation of said fairing member with respect to said exhaust nozzle.

15. A structural assembly as set forth in claim 2 wherein said track defining means and said track follower means include at least five track/follower couplings and wherein a first and second of said couplings serve to respectively couple the opposed longitudinal edges of said sheet-like flexible fairing member to said first tubular member, a third of said couplings serves to couple said fairing member to said first tubular member along the longitudinal centerline of said fairing member, the fourth and fifth of said couplings serve to respectively couple said fairing member to said second tubular member along lines intermediate said third coupling and each of said first and second couplings, and wherein all of said couplings permit of relative translation of said fairing member with respect to said first and second tubular members, said track follower means associated with said first, second and third of said couplings are fixedly secured to said fairing member, and said actuating means are drivingly connected to said track follower means associated with said first, second and third couplings for translating all of said track follower means relative to their respective track defining means and thereby translating said fairing member relative to said first and second tubular members between deployed and retracted positions.

16. In an aircraft having an empennage including an empennage body structure and of the type including an auxiliary center boost jet engine having an air inlet and a rearwardly directed exhaust nozzle mounted within and spaced inwardly from the empennage body structure with said empennage body structure having an outlet of fixed predetermined diameter, a retractable/deployable nozzle fairing system for aerodynamically streamlining the exhaust nozzle and reducing the diameter of the empennage outlet to minimize base drag characteristics when the center boost jet engine is shut down, said retractable/deployable nozzle fairing system comprising, in combination:

(a) a fairing member formed of sheet-like flexible material positioned within the annular space defined by the outer surface of said exhaust nozzle and the inner surface of said empennage body structure with said fairing member partially surrounding said exhaust nozzle when in the retracted position;

(b) means for mounting said fairing member on at least one of said empennage body structure and said exhaust nozzle with freedom for controlled translation relative thereto between: (i) a retracted position disposed entirely within said annular space; (ii), a rearwardly deployed position wherein said fairing member defines a truncated conical rearward extension of said empennage body structure with said truncated conical extension having an outlet of substantially reduced diameter at the apical end thereof;

(c) said mounting means including track defining means and track follower means with one of said track defining means and said track follower means being fixedly secured to said fairing member and the other of said track defining means and said track follower means being fixedly secured to at least one of said empennage body structure and said exhaust nozzle so as to permit said sheet-like fairing member to: (i) gradually expand as it translates in a forward direction relative to said exhaust nozzle and said empennage body structure from a fully deployed truncated conical position to a fully retracted position with the opposed longitudinal edges of said fairing member parted with respect to one another; and (ii), gradually contract as it translates rearwardly relative to said exhaust nozzle and said empennage body structure from a fully retracted position to a fully deployed position with the opposed longitudinal edges of said fairing member being abutted together when in the fully deployed position so as to form said truncated conical empennage extension; and, (d) actuating means for translating said fairing member to a fully deployed position when the aircraft is in a *cruise* operational mode and the center boost jet engine is shut down, and for translating said fairing member to a fully retracted position when the center boost jet engine is operational.

17. A retractable/deployable nozzle fairing system as set forth in claim 16 wherein said sheet-like flexible material defining said fairing member is preformed in its deployed truncated conical configuration with its opposite longitudinal edges abutting and defining a parting line therebetween so that said fairing member is in the zero stressed contracted state when deployed and is in the stressed expanded state when retracted.

18. A retractable/deployable nozzle fairing system as set forth in claim 17 wherein said parting line is coincident with the keel line of said exhaust nozzle.

19. A retractable/deployable nozzle fairing system as set forth in claim 16, 17 or 18 wherein locking means are mounted on the opposed longitudinal edges of said fairing member for locking said edges together when said fairing member is deployed as a truncated conical extension of said empennage body structure.

20. A retractable/deployable nozzle fairing system as set forth in claim 16, 17 or 18 wherein mutually engagable means are mounted on the opposed longitudinal edges of said fairing member for locking said edges together when said fairing member is deployed as a truncated conical extension of said empennage body structure, said actuating means including means for imparting differential translational motion to the opposite longitudinal edges of said sheet-like flexible fairing member so as to permit mutual engagement and locking of said edges together upon deployment of said fairing member and mutual disengagement and unlocking of said edges upon retraction of said fairing member.

21. A retractable/deployable nozzle fairing system as set forth in claim 16, 17 and 18 wherein one longitudinal edge of said sheet-like flexible member is provided with laterally projecting bayonet-type lugs and the opposite longitudinal edge of said sheet-like flexible member is provided with means defining lug-receiving slots, said actuating means including means for imparting differential translational motion to the opposite longitudinal edges of said sheet-like flexible fairing member so as to permit entry of said lugs into said slots upon deployment of said fairing member to lock said longitudinal edges together and withdrawal of said lugs from said slots upon retraction of said fairing member.

22. A retractable/deployable nozzle fairing system as set forth in claim 16, 17 or 18 wherein said track defining means and said track follower means include at least three track/follower couplings and wherein two of said couplings serve to respectively couple the opposed longitudinal edges of said sheet-like flexible fairing member to at least one of said empennage body structure and said exhaust nozzle, a third of said couplings serves to couple said fairing member to at least one of said empennage body structure and said exhaust nozzle along the longitudinal centerline of said fairing member, and wherein all of said couplings permit of relative translation of said fairing member with respect to said exhaust nozzle and said empennage body structure.

23. A retractable/deployable nozzle fairing system as set forth in claim 16, 17 or 18 wherein said track defining means and said track follower means include at least three track/follower couplings and wherein two of said couplings serve to respectively couple the opposed longitudinal edges of said sheet-like flexible fairing member to at leaast one of said empennage body structure and said exhaust nozzle, a third of said couplings serves to couple said fairing member to at least one of said empennage body structure and said exhaust nozzle along the longitudinal centerline of said fairing member, and wherein all of said track follower means are fixedly secured to said fairing member, and said actuating means are drivingly connected to said track follower means for translating said track follower means relative to said track defining means and thereby translating said fairing member with respect to said exhaust nozzle and said empennage body structure.

24. A retractable/deployable nozzle fairing system as set forth in claim 16, 17 or 18 wherein said track defining means and said track follower means include at least three track/follower couplings and wherein two of said couplings serve to respectively couple the opposed longitudinal edges of said sheet-like flexible fairing member to said empennage body structure, a third of said couplings serves to couple said fairing member to said empennage body structure along the longitudinal centerline of said fairing member, and wherein all of said couplings permit of relative translation of said fairing member with respect to said exhaust nozzle and said empennage body structure.

25. A retractable/deployable nozzle fairing system as set forth in claim 16, 17 or 18 wherein said track defining means and said track follower means include at least five track/follower couplings and wherein a first and second of said couplings serve to respectively couple the opposed longitudinal edges of said sheet-like flexible fairing member to at least one of said empennage body structure and said exhaust nozzle, a third of said couplings serves to couple said fairing member to at least one of said empennage body structure and said exhaust nozzle along the longitudinal centerline of said fairing member, the fourth and fifth of said couplings serve to respectively couple said fairing member to at least one of said empennage body structure and said exhaust nozzle along lines intermediate said third coupling and each of said first and second couplings, and wherein all of said couplings permit of relative translation of said fairing member with respect to said exhaust nozzle and said empennage body structure.

26. A retractable/deployable nozzle fairing system as set forth in claim 16, 17 or 18 wherein said track defining means and said track follower means include at least five track/follower couplings and wherein a first and second of said couplings serve to respectively couple the opposed longitudinal edges of said sheet-like flexible fairing member to at least one of said empennage body structure and said exhaust nozzle, a third of said couplings serves to couple said fairing member to at least one of said empennage body structure and said exhaust nozzle along the longitudinal centerline of said fairing member, the fourth and fifth of said couplings serve to respectively couple said fairing member to at least one of said empennage body structure and said exhaust nozzle along lines intermediate said third coupling and each of said first and second couplings, and wherein all of said couplings permit of relative translation of said fairing member with respect to said exhaust nozzle and said empennage body structure, said track follower means associated with said first, second and third of said couplings are fixedly secured to said fairing member, and said actuating means are drivingly connected to said track follower means associated with said first, second and third couplings for translating all of said track follower means relative to their respective track defining means and thereby translating said fairing member relative to said exhaust nozzle and said empennage body structure between deployed and retracted positions.

27. A retractable/deployable nozzle fairing system as set forth in claim 16, 17 or 18 wherein said track defining means and said track follower means include at least five track/follower couplings and wherein a first and second of said couplings serve to respectively couple the opposed longitudinal edges of said sheet-like flexible fairing member to said empennage body structure, a third of said couplings serves to couple to said fairing member to said empennage body structure along the longitudinal centerline of said fairing member, the fourth and fifth of said couplings serve to respectively couple said fairing member to at least one of said empennage body structure and said exhaust nozzle along lines intermediate said third coupling and each of said first and second couplings, and wherein all of said couplings permit of relative translation of said fairing member with respect to said exhaust nozzle and said empennage body structure.

28. A retractable/deployable nozzle fairing system as set forth in claim 16, 17 or 18 wherein said track defining means and said track follower means include at least five track/follower couplings and wherein a first and second of said couplings serve to respectively couple the opposed longitudinal edges of said sheet-like flexible fairing member to at least one of said empennage body structure and said exhaust nozzle, a third of said couplings serves to couple said fairing member to at least one of said empennage body structure and said exhaust nozzle along the longitudinal centerline of said fairing member, the fourth and fifth of said couplings serve to respectively couple said fairing member to said exhaust nozzle along lines intermediate said third coupling and each of said first and second couplings, and wherein all of said couplings permit of relative translation of said fairing member with respect to said exhaust nozzle and said empennage body structure.

29. A retractable/deployable nozzle fairing system as set forth in claim 16, 17 or 18 wherein said track defining means and said track follower means include at least five track/follower couplings and wherein a first and second of said couplings serve to respectively couple the opposed longitudinal edges of said sheet-like flexible fairing member to said empennage body structure, a third of said couplings serves to couple said fairing member to said empennage body structure along the longitudinal centerline of said fairing member, the fourth and fifth of said couplings serve to respectively couple said fairing member to said exhaust nozzle along lines intermediate said third coupling and each of said first and second couplings, and wherein all of said couplings permit of relative translation of said fairing member with respect to said exhaust nozzle and said empennage body structure.

30. A retractable/deployable nozzle fairing system as set forth in claim 16, 17 or 18 wherein said track defining means and said track follower means include at least five track/follower couplings and wherein a first and second of said couplings serve to respectively couple the opposed longitudinal edges of said sheet-like flexible fairing member to said empennage body structure, a third of said couplings serves to couple said fairing member to said empennage body structure along the longitudinal centerline of said fairing member, the fourth and fifth of said couplings serve to respectively couple said fairing member to said exhaust nozzle along lines intermediate said third coupling and each of said first and second couplings, and wherein all of said couplings permit of relative translation of said fairing member with respect to said exhaust nozzle and said empennage body structure, said track follower means associated with said first, second and third of said couplings are fixedly secured to said fairing member, and said actuating means are drivingly connected to said track follower means associated with said first, second and third couplings for translating all of said track follower means relative to their respective track defining means and thereby translating said fairing member relative to said exhaust nozzle and said empennage body structure between deployed and retracted positions.

31. An aircraft of the type having multiple main propulsion engines, an empennage including an empennage body structure, and an auxiliary center boost jet engine having an air inlet and an exhaust nozzle mounted within and spaced inwardly from the empennage body structure, and comprising, in combination:
  (a) an empennage body structure having a generally truncated conical configuration at its rearmost extremity;
  (b) an exhaust nozzle coupled to the center boost jet engine and projecting rearwardly through and spaced inwardly from said empennage body structure, said exhaust nozzle terminating at its rearmost extremity in a truncated conical portion of smaller outside diameter than the inside diameter of said truncated conical portion of said empennage body structure, said empennage body structure having an outlet of fixed predetermined diameter lying generally in a plane passing through said truncated conical extremities of said exhaust nozzle and said empennage body structure;
  (c) a fairing member formed of sheet-like flexible material positioned within the annular space defined by the outer surface of said truncated conical portion of said exhaust nozzle and the inner surface of said truncated conical portion of said empennage body structure with said fairing member partially surrounding said exhaust nozzle when in the retracted position;
  (d) means for mounting said fairing member on at least one of said empennage body structure and said exhaust nozzle with freedom for controlled translation relative thereto between: (i) a retracted position disposed entirely within said annular space; and (ii), a rearwardly deployed position wherein said fairing member defines a truncated conical rearward extension of said empennage body structure with said truncated conical extension having an outlet of substantially reduced diameter at the apical end thereof;
  (e) said mounting means including track defining means and track follower means with one of said track defining means and said track follower means being fixedly secured to said fairing member and the other of said track defining means and said track follower means being fixedly secured to at least one of said empennage body structure and said exhaust nozzle so as to permit said sheet-like fairing member to: (i) gradually expand as it translates in a forward direction relative to said exhaust nozzle and said empennage body structure from a fully deployed truncated conical position to a fully retracted position with the opposed longitudinal edges of said fairing member parted with respect to one another; and (ii), gradually contract as it translates rearwardly relative to said exhaust nozzle and said empennage body structure from a fully retracted position to a fully deployed position with the opposed longitudinal edges of said fairing member being abutted together when in the fully deployed position so as to form said truncated conical empennage extension; and,
  (f) actuating means for translating said fairing member to a fully deployed position when the aircraft is in a cruise operational mode and the center boost jet engine is shut down, and for translating said fairing member to a fully retracted position when said center boost jet engine is operational.

32. An aircraft as set forth in claim 31 wherein said sheet-like flexible material defining said fairing member is preformed in its deployed truncated conical configuration with its opposite longitudinal edges abutting and defining a parting line therebetween so that said fairing member is in the zero stressed contracted state when deployed and is in the stressed expanded state when retracted.

33. An aircraft as set forth in claim 32 wherein said parting line is coincident with the keel line of said exhaust nozzle.

34. An aircraft as set forth in claim 31, 32 or 33 wherein locking means are mounted on the opposed longitudinal edges of said fairing member for locking said edges together when said fairing member is deployed as a truncated conical extension of said empennage body structure.

35. An aircraft as set forth in claim 31, 32 or 33 wherein mutually engagable locking means are mounted on the opposed longitudinal edges of said fairing member for locking said edges together when said fairing member is deployed as a truncated conical extension of said empennage body structure nozzle, said actuating means including means for imparting differential translational motion to the opposite longitudinal edges of said sheet-like flexible fairing member so as to permit mutual engagement and locking of said edges together upon deployment of said fairing member and mutual disengagement and unlocking of said edges upon retraction of said fairing member.

36. An aircraft as set forth in claim 31, 32 or 33 wherein one longitudinal edge of said sheet-like flexible member is provided with laterally projecting bayonet-type lugs and the opposite longitudinal edge of said sheet-like flexible member is provided with means defining lug-receiving slots, said actuating means including means for imparting differential translational motion to the opposite longitudinal edges of said sheet-like flexible fairing member so as to permit entry of said lugs into said slots upon deployment of said fairing member to lock said longitudinal edges together and withdrawal of said lugs from said slots upon retraction of said fairing member.

37. An aircraft as set forth in claim 31, 32 or 33 wherein said track defining means and said track follower means include at least three track/follower couplings and wherein two of said couplings serve to respectively couple the opposed longitudinal edges of said sheet-like flexible fairing member to at at least one of said empennage body structure and said exhaust nozzle, a third of said couplings serves to couple said fairing member to at least one of said empennage body structure and said exhaust nozzle along the longitudinal centerline of said fairing member, and wherein all of said couplings permit of relative translation of said fairing member with respect to said exhaust nozzle and said empennage body structure.

38. An aircraft as set forth in claim 31, 32 or 33 wherein said track defining means and said track follower means include at least three track/follower couplings and wherein two of said couplings serve to respectively couple the opposed longitudinal edges of said sheet-like flexible fairing member to at least one of said empennage body structure and said exhaust nozzle, a third of said couplings serves to couple said fairing member to at least one of said empennage body structure and said exhaust nozzle along the longitudinal centerline of said fairing member, and wherein all of said track follower means are fixedly secured to said fairing member, and said actuating means are drivingly connected to said track follower means for translating said track follower means relative to said track defining means and thereby translating said fairing member with respect to said exhaust nozzle and said empennage body structure.

39. An aircraft as set forth in claim 31, 32 or 33 wherein said track defining means and said track follower means include at least three track/follower couplings and wherein two of said couplings serve to respectively couple the opposed longitudinal edges of said sheet-like flexible fairing member to said empennage body structure, a third of said couplings serves to couple said fairing member to said empennage body structure along the longitudinal centerline of said fairing member, and wherein all of said couplings permit of relative translation of said fairing member with respect to said exhaust nozzle and said empennage body structure.

40. An aircraft as set forth in claim 31, 32 or 33 wherein said track defining means and said track follower means include at least five track/follower couplings and wherein a first and second of said couplings serve to respectively couple the opposed longitudinal edges of said sheet-like flexible fairing member to at least one of said empennage body structure and said exhaust nozzle, a third of said couplings serves to couple said fairing member to at least one of said empennage body structure and said exhaust nozzle along the longitudinal centerline of said fairing member, the fourth and fifth of said couplings serve to respectively couple said fairing member to at least one of said empennage body structure and said exhaust nozzle along lines intermediate said third coupling and each of said first and second couplings, and wherein all of said couplings permit of relative translation of said fairing member with respect to said exhaust nozzle and said empennage body structure.

41. An aircraft as set forth in claim 31, 32 or 33 wherein said track defining means and said track follower means include at least five track/follower couplings and wherein a first and second of said couplings serve to respectively couple the opposed longitudinal edges of said sheet-like flexible fairing member to at least one of said empennage body structure and said exhaust nozzle, a third of said couplings serves to couple said fairing member to at least one of said empennage body structure and said exhaust nozzle along the longitudinal centerline of said fairing member, the fourth and fifth of said couplings serve to respectively couple said fairing member to at least one of said empennage body structure and said exhaust nozzle along lines intermediate said third coupling and each of said first and second couplings, and wherein all of said couplings permit of relative translation of said fairing member with respect to said exhaust nozzle and said empennage body structure, said track follower means associated with said first, second and third of said couplings are fixedly secured to said fairing member, and said actuating means are drivingly connected to said track follower means associated with said first, second and third couplings for translating all of said track follower means relative to their respective track defining means and thereby translating said fairing member relative to said exhaust nozzle and said empennage body structure between deployed and retracted positions.

42. An aircraft as set forth in claim 31, 32 or 33 wherein said track defining means and said track follower means include at least five track/follower couplings and wherein a first and second of said couplings serve to respectively couple the opposed longitudinal edges of said sheet-like flexible fairing member to said empennage body structure, a third of said couplings serves to couple said fairing member to said empennage body structure along the longitudinal centerline of said fairing member, the fourth and fifth of said couplings serve to respectively couple said fairing member to at least one of said empennage body structure and said exhaust nozzle along lines intermediate said third coupling and each of said first and second couplings, and wherein all of said couplings permit of relative translation of said fairing member with respect to said exhaust nozzle and said empennage body structure.

43. An aircraft as set forth in claim 31, 32 or 33 wherein said track defining means and said track follower means include at least five track follower couplings and wherein a first and second of said couplings serve to respectively couple the opposed longitudinal edges of said sheet-like flexible fairing member to at least one of said empennage body structure and said exhaust nozzle, a third of said couplings serves to couple said fairing member to at least one of said empennage body structure and said exhaust nozzle along the longitudinal centerline of said fairing member, the fourth and fifth of said couplings serve to respectively couple said fairing member to said exhaust nozzle along lines intermediate said third coupling and each of said first and second couplings, and wherein all of said couplings permit of relative translation of said fairing member with respect to said exhaust nozzle and said empennage body structure.

44. An aircraft as set forth in claim 31, 32 or 33 wherein said track defining means and said track follower means include at least five track/follower couplings and wherein a first and second of said couplings serve to respectively couple the opposed longitudinal edges of said sheet-like flexible fairing member to said empennage body structure, a third of said couplings serves to couple said fairing member to said empennage body structure along the longitudinal centerline of said fairing member, the fourth and fifth of said couplings serve to respectively couple said fairing member to said exhaust nozzle along lines intermediate said third coupling and each of said first and second couplings, and wherein all of said couplings permit of relative translation of said fairing member with respect to said exhaust nozzle and said empennage body structure.

45. An aircraft as set forth in claim 31, 32 or 33 wherein said track defining means and said track follower means include at least five track/follower couplings and wherein a first and second of said couplings serve to respectively couple the opposed longitudinal edges of said sheet-like flexible fairing member to said empennage body structure, a third of said couplings serves to couple said fairing member to said empennage body structure along the longitudinal centerline of said fairing member, the fourth and fifth of said couplings serve to respectively couple said fairing member to said exhaust nozzle along lines intermediate said third coupling and each of said first and second couplings, and wherein all of said couplings permit of relative translation of said fairing member with respect to said exhaust nozzle and said empennage body structure, said track follower means associated with said first, second and third of said couplings are fixedly secured to said fairing member, and said actuating means are drivingly connected to said track follower means associated with said first, second and third couplings for translating all of said track follower means relative to their respective track defining means and thereby translating said fairing member relative to said exhaust nozzle and said empennage body structure between deployed and retracted positions.

46. An aircraft as set forth in claim 31, 32 or 33 wherein means are provided for closing said air inlet when said sheet-like flexible fairing member is deployed.

* * * * *